United States Patent
Dinh et al.

(10) Patent No.: US 10,491,481 B2
(45) Date of Patent: Nov. 26, 2019

(54) MESSAGING QUEUE TOPOLOGY CONFIGURATION SYSTEM

(71) Applicant: Dell Products L.P., Round Rock, TX (US)

(72) Inventors: Hung Dinh, Austin, TX (US); Sijoy Thomas, Leander, TX (US); Vinod Kumar, Karnataka (IN); Vinay Sathyanarayana, Karnataka (IN); Mohammed Imran V., Karnataka (IN)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 15/582,148

(22) Filed: Apr. 28, 2017

(65) Prior Publication Data
US 2018/0314407 A1    Nov. 1, 2018

(51) Int. Cl.
*H04L 12/24*    (2006.01)
*G06F 9/451*    (2018.01)
*H04L 12/58*    (2006.01)

(52) U.S. Cl.
CPC .............. *H04L 41/12* (2013.01); *G06F 9/453* (2018.02); *H04L 41/0806* (2013.01); *H04L 41/22* (2013.01); *H04L 51/26* (2013.01)

(58) Field of Classification Search
CPC ..... H04L 41/12; H04L 41/0806; H04L 41/22; H04L 51/00; H04L 9/44505; H04L 9/453
See application file for complete search history.

(56) References Cited

U.S. PATENT DOCUMENTS

| | | | |
|---|---|---|---|
| 2005/0240990 A1* | 10/2005 | Trutner ............... | H04L 63/0227 726/11 |
| 2007/0179822 A1* | 8/2007 | Benayon ............... | G06Q 10/04 705/70 |

(Continued)

OTHER PUBLICATIONS

Peter Broadhurst, "Scalable MQ Topologies Across Project Teams and Administrative Domains," 2013, 13 Pages, IBM Software, International Business Machines Corporation.

(Continued)

*Primary Examiner* — Ronald J Casillas
(74) *Attorney, Agent, or Firm* — Haynes and Boone, LLP

(57) ABSTRACT

A messaging queue system includes computing devices that each host an application, a messaging queue service device that is coupled to the computing devices and that hosts a messaging queue service for each of the applications, and a messaging queue topology configuration service device that is coupled to the messaging queue service device. The messaging queue topology configuration service device receives a selection of application use criteria. The messaging queue topology configuration service device then determines a recommended messaging queue topology solution based on the selection of application use criteria. The messaging queue topology configuration service device may then receive messaging queue object details for each messaging queue object that will make up the messaging queue topology. The messaging queue topology configuration service device then creates the messaging queue topology with each messaging queue object based on the messaging queue topology solution and the messaging queue object details.

20 Claims, 12 Drawing Sheets

(56) References Cited

U.S. PATENT DOCUMENTS

2012/0304174 A1* 11/2012 Arnold ..................... G06F 8/36
 718/1
2016/0261615 A1* 9/2016 Sonnenberg .......... H04L 63/101
2018/0309790 A1* 10/2018 Johnson ................. H04L 63/20

OTHER PUBLICATIONS

Peter Broadhurst, "A Flexible and Scalable WebSphere MQ Topology Pattern: Part 1: Building a Multi-Purpose WebSphere MQ Infrastructure With Scalability and High Availability," Mar. 27, 2013, 23 Pages, Developer Works®, https://www.ibm.com/developerworks/websphere/library/techarticles/1303_broadhurst/1303_broadhurst.html.

* cited by examiner

MESSAGING QUEUE TOPOLOGY CONFIGURATION SYSTEM

BACKGROUND

The present disclosure relates generally to information handling systems, and more particularly to a messaging queue topology configuration system for configuring and implementing a messaging queue topology.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be used to provide a messaging queue system that allows applications running on computing devices to communicate with each other. A messaging queue system utilizes a message-oriented middleware that includes a software and/or hardware infrastructure that supports the sending and receiving of messages between distributed systems. The message-oriented middleware provides message queue managers that manage message queues that store messages received from sender applications on computing devices until receiver applications on other computing devices retrieve those messages for processing. As such, messaging queue systems can provide asynchronous messaging between multiple sender applications and receiver applications. The asynchronous nature of the messaging queues is ideal for communication via disparate technologies as long as each of those technologies can access the message queue.

The message-oriented middleware of the messaging queue system may be used to create messaging queue objects (e.g., message queue managers, message queues, topics, channels, etc.) for the messaging queue system, and those messaging queue objects may be arranged in a number of messaging queue topologies that provide different benefits for different use scenarios expected for the messaging queue system. For example, the messaging queue objects may be configured to provide a point-to-point messaging queue topology where queued messages travel from a point of origin to a single destination, and routing in such point-to-point messaging queue topologies may be determined per-queue and embedded in the network definition at build time. As such, point-to-point messaging queue topologies are well suited for a traditional batch interface or legacy systems. In another example, the messaging queue objects may be configured to provide a cluster messaging queue topology where messages travel from a point of origin to one of several possible destinations, and routing in such cluster messaging queue topologies may allow for the selection of the destination and the routing (per-message) to occur at run time. Furthermore, other messaging queue topologies may include the use of a hybrid point-to-point/cluster messaging queue topology, publish/subscribe messaging queue topologies, and/or other messaging queue topologies known in the art.

Determining and implementing a messaging queue topology for a particular messaging queue system is often time consuming for a messaging queue developer. For example, the messaging queue developer must determine the best messaging queue topology for a particular customer, and then manually configure the messaging queue topology by installing the message-oriented middleware on multiple systems, creating messaging queue objects, and configuring those objects to communicate according to the best messaging queue topology for the particular customer that was determined by the messaging queue developer. Furthermore, end user's needs for the messaging queue system often change, which may require reconfiguration of the messaging queue topology for that messaging queue system. Conventional message-oriented middleware lacks any functionality that programmatically tests and implements messaging queue topologies, which often results inefficiently implemented messaging queue systems.

Accordingly, it would be desirable to provide an improved messaging queue topology configuration system.

SUMMARY

According to one embodiment, an information handling system (IHS) includes a display device; a user input device; a processing system that is coupled to the display device and the user input device; and a memory system that is coupled to the processing system and that includes instructions that, when executed by the processing system, cause the processing system to: display, on the display device, a user interface that includes a plurality of application use criteria that is associated with the one or more applications that are to be implemented in a messaging queue topology; receive, from the user input device and via the user interface, a selection of application use criteria from the plurality of application use criteria; determine one or more recommended messaging queue topology solutions based on the selection of application use criteria and display, on the display device, the user interface including the one or more recommended messaging topologies solutions; receive, from the user input device and via the user interface, a selection of a messaging queue topology solution of the one or more recommended messaging queue topology solutions; receive, from the user input device and via the user interface, messaging queue object details for each messaging queue object of a plurality of messaging queue objects that will make up the messaging queue topology; and create the messaging queue topology with each messaging queue object of the plurality of messaging queue objects based on the messaging queue topology solution and the messaging queue object details.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system may also include one or more buses operable to transmit communications between the various hardware components.

Figure 1:
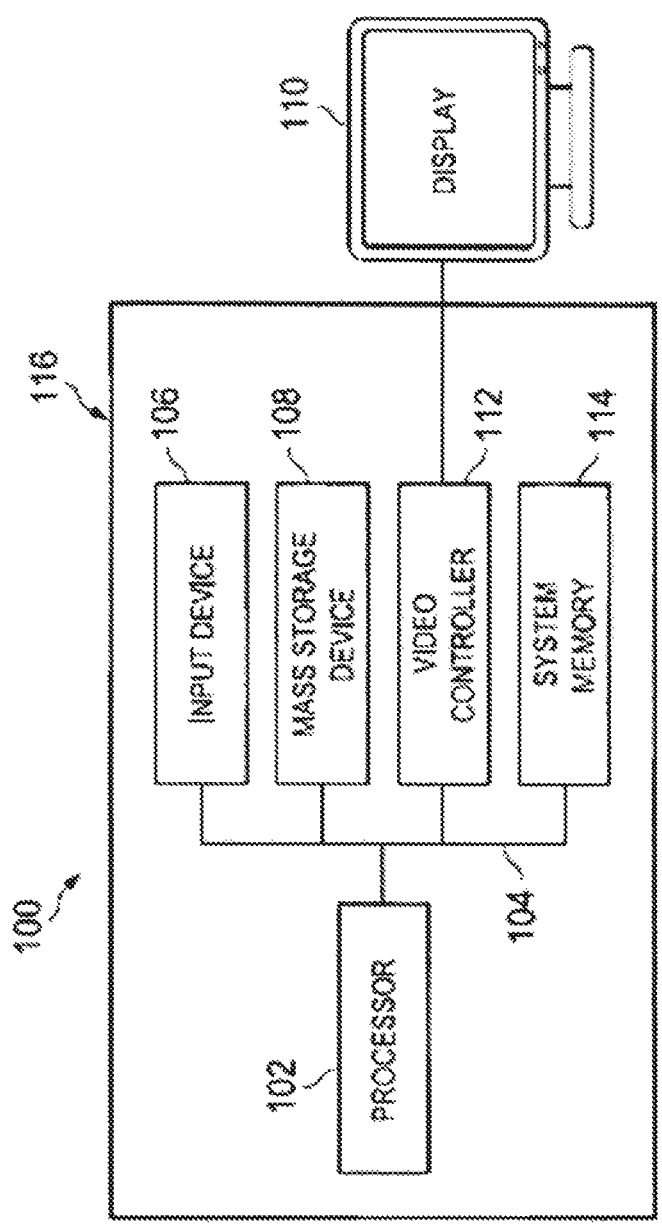
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
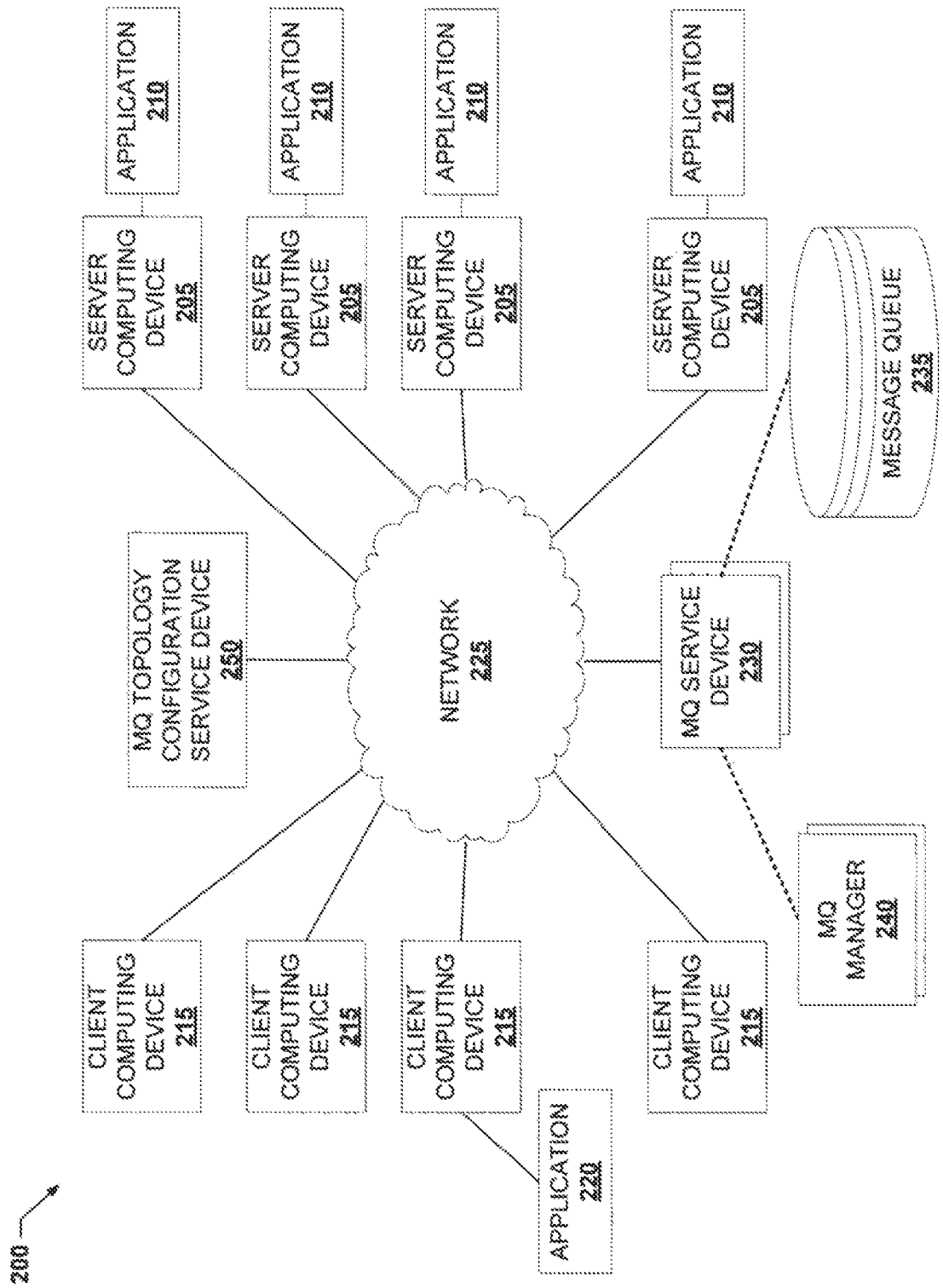
FIG. 2 is a schematic view illustrating an embodiment of a messaging queue system.

Referring now to FIG. 2, an embodiment of a messaging queue system 200 is illustrated. While the embodiment illustrated in FIG. 2 provides an example of a use of the messaging queue system 200 of the present disclosure in supporting messaging queue topology configuration for the messaging queue system, one of skill in the art in possession of the present disclosure will recognize that messaging queue topology configuration of the present disclosure may be provided for a different numbers of devices, a variety of different types of device, and a variety of different orientations of devices, while remaining within the scope of the present disclosure. The messaging queue system 200 may include one or more server computing devices 205 that may each be the IHS 100 discussed above with reference to FIG. 1, and/or that may include some or all of the components of the IHS 100. For example, the server computing devices 205 may include one or more server devices and/or other computing devices (e.g., desktop computing device(s), laptop/notebook computing device(s), tablet computing device(s), mobile phone(s), etc.) known in the art. Each of the server computing devices 205 may host and/or otherwise provide for the execution of one or more applications 210 (e.g., a web applications for completing transactions, web chat communication applications, debugging applications, video encoding applications, e-mail applications, social media applications and other applications that would be apparent to one of skill in the art in possession of the present disclosure) that utilize the messaging queue system 200.

The messaging queue system 200 also includes one or more client computing devices 215 that may be the IHS 100 discussed above with reference to FIG. 1, and/or that may include some or all of the components of the IHS 100. For example, the client computing devices 215 may include one or more client devices, server devices, and/or other computing devices (e.g., desktop computing device(s), laptop/notebook computing device(s), tablet computing device(s), mobile phone(s), etc.) known in the art. Each of the client computing devices 215 may host or otherwise provide for the execution of one or more applications 220. In an embodiment, the one or more of the applications 210 hosted by the server computing device 205 may be accessed through the client computing devices 215 to send and/or retrieve messages over a network 225 such as, for example, the Internet, a Local Area Network, and/or other networks known in the art, using a cellular communication techniques, WiFi communication techniques, and/or other communication techniques known in the art. Further, individual ones of the server computing devices 205 may be coupled to one another over the network 225 such that the applications 210 may provide messages to each other.

The messaging queue system 200 also includes a messaging queue service device 230 that may be the IHS 100 discussed above with reference to FIG. 1, and/or that may include some or all of the components of the IHS 100. For example, the messaging queue service device 230 may include one or more computing devices (e.g., desktop computing device(s), laptop/notebook computing device(s), tablet computing device(s), mobile phone(s), etc.) known in the art. As illustrated in FIG. 2, the messaging queue service device 230 may be communicatively coupled to the server computing devices 205 and client computing devices 215 over the network 225. The messaging queue service device 230 may host or otherwise provide a message-oriented middleware application that may support the operation of one or more message queues 235 managed by one or more message queue managers 240, discussed in further detail below. In this regard, the message queue manager 240 may be a computer program executed by one or more of the processors in the messaging queue service device 230 (e.g., via instructions on a non-transitory memory in the messaging queue service device 230) to manage receipt of and/or access to messages in the message queue 235 over the network 225 by different ones of the applications 210 and/or 220. Further, each of the messages in the message queue 235 may include content that is expressed in a body of the message, as well as a header portion of the message, and that is used by the message queue manager 240 to determine how to process that message in the message queue 235. While the message-oriented middleware application is discussed as being hosted on the messaging queue service device 230 that is illustrated as separate from the server computing devices 205 and client computing devices 215, one of skill in the art in possession of the present disclosure will recognize that the messaging queue service device 230 may be provided by any of the server computing devices 205 and/or the client computing devices 215 that host the applications 210 and 220, may be provided by one or more server computing devices 205 hosting applications, may be provided by multiple messaging queue services devices 230 that provide separate instances of the message-oriented middleware to one or more server computing devices 205 and/or client computing devices 215, and may be included in a cluster messaging queue topology, a point-to-point messaging queue topology, and/or other messaging queue topologies known in the art while remaining in the scope of the present disclosure.

The messaging queue system 200 also includes a messaging queue topology configuration service device 250 that may be the IHS 100 discussed above with reference to FIG. 1, and/or that may include some or all of the components of the IHS 100. For example, the messaging queue topology configuration service device 250 may include one or more computing devices (e.g., desktop computing device(s), laptop/notebook computing device(s), tablet computing device(s), mobile phone(s), etc.) known in the art. The messaging queue topology configuration service device 250 may be communicatively coupled to the server computing devices 205, client computing devices 215 and the messaging queue service device 230 over the network 225 to provide a messaging queue topology by, for example, utilizing the message-oriented middleware application to create the messaging queue topology identified by the messaging queue topology configuration service device 250, as discussed further below. While the messaging queue topology configuration service device 250 is illustrated as separate device, one skilled in the art in possession of the present disclosure will recognize that a messaging queue topology configuration service provided by the messaging queue topology configuration service device 250 may be provided by any of the server computing devices 205, client computing devices 215, and/or messaging queue service device 230 without departing from the scope of the present disclosure.

Figure 3:
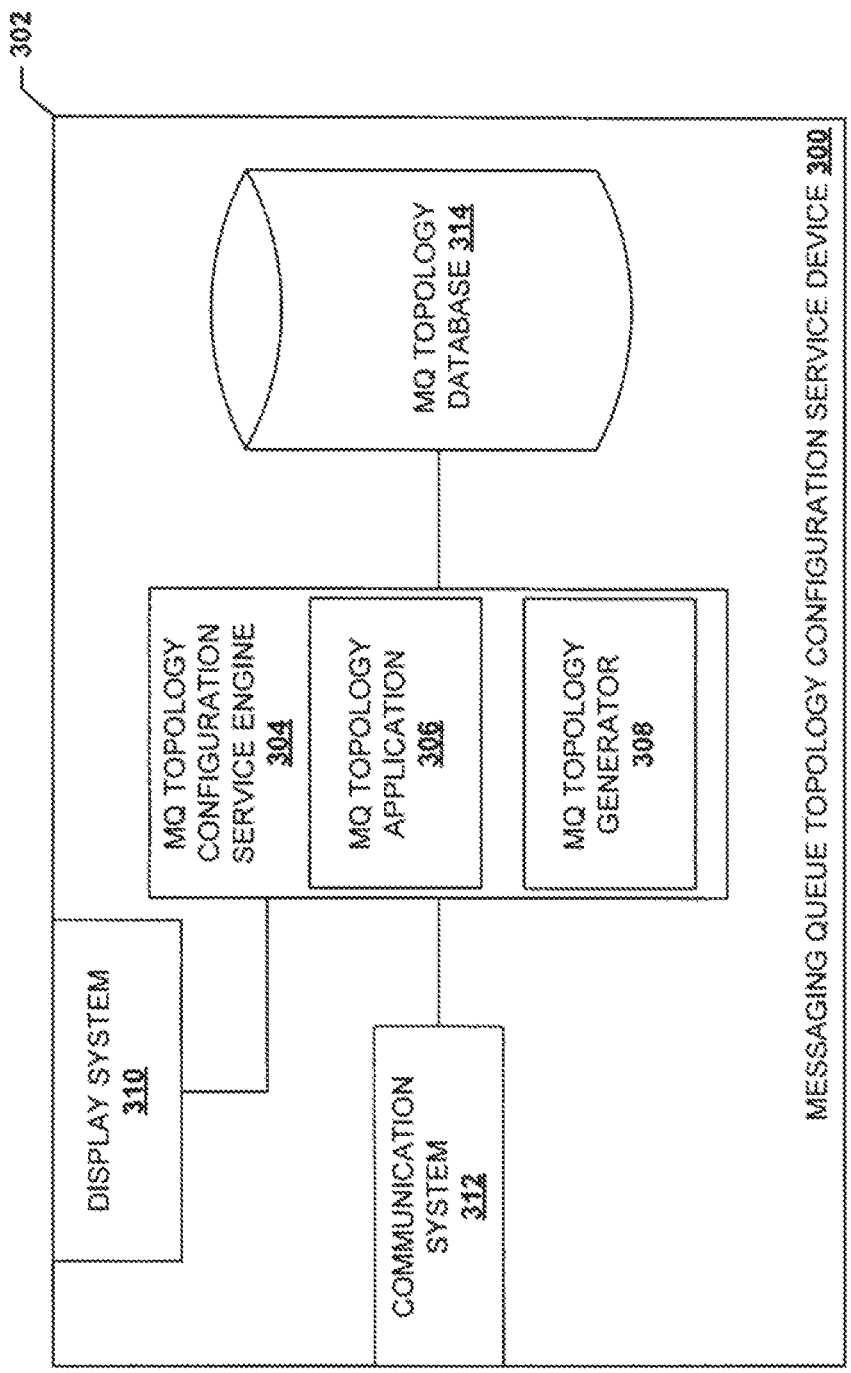
FIG. 3 is a schematic view illustrating an embodiment of a messaging queue topology configuration service device used in the messaging queue system of FIG. 2.

Referring now to FIG. 3, an embodiment of a messaging queue topology configuration service device 300 is illustrated that may be the messaging queue topology configuration service device 250 discussed above with reference to FIG. 2. As such, the messaging queue topology configuration service device 300 may be the IHS discussed above with reference to FIG. 1 and/or may include some or all of the components of the IHS 100, and in specific embodiments may be provided by a computing device (e.g., desktop computing device(s), laptop/notebook computing device(s), tablet computing device(s), mobile phone(s), etc.) known in the art. In the illustrated embodiment, the messaging queue topology configuration service device 300 includes a chassis 302 that houses the components of the messaging queue topology configuration service device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a messaging queue topology configuration service engine 304 that is configured to perform the functionality of the messaging queue topology configuration service engine, messaging queue topology configuration service engine sub-engines, and/or messaging queue topology configuration service devices discussed below.

In the illustrated embodiment, the messaging queue topology configuration service engine 304 includes messaging queue topology configuration service sub-engines such as a messaging queue topology application 306 and a messaging queue topology generator 308 illustrated in FIG. 3. In an embodiment, the messaging queue topology application 306 is configured to provide a user interface through a display system 310 that is housed in the chassis 302, that may be coupled to the messaging queue topology configuration service engine 304 (e.g., via a coupling between the display system 310 and the processing system), and that is configured to display information discussed below via the user interface. While the display system 310 is illustrated as housed in the chassis 302, one skilled in the art will recognize that the display system 310 may be housed in a chassis of another computing device that is in communication with the messaging queue topology configuration service engine 304 through, for example, a communication system 312 that is housed in the chassis 302, that is coupled to the messaging queue topology configuration service engine 304 (e.g., via a coupling between the communication system 312 and the processing system), and that may include a Network Interface Controller (NIC), a wireless communication system (e.g., a BLUETOOTH® communication system, an NFC communication system, etc.), and/or other communication components that enable the communication discussed below. In an embodiment, the messaging queue topology generator 308 is configured to create a messaging queue topology for a messaging queue system based on user inputs received through the user interface provided by the messaging queue topology application 306, as well as perform the functionality of the messaging queue topology generator discussed below.

The chassis 302 may also house a storage system (not illustrated, but which may include the storage device 108 discussed above with reference to FIG. 1) that is coupled to the messaging queue topology configuration service engine 304 (e.g., via a coupling between the storage system and the processing system) and that includes a messaging queue topology database 314 that is configured to store the data that enables the functionality discussed below. While a specific embodiment of a messaging queue topology configuration service device 300 has been described, one of skill in the art in possession of the present disclosure will recognize that messaging queue topology configuration service devices may be provided with a variety of other components that provide for conventional messaging queue topology configuration service device functionality, as well as the functionality discussed below, while remaining within the scope of the present disclosure.

Figure 4:
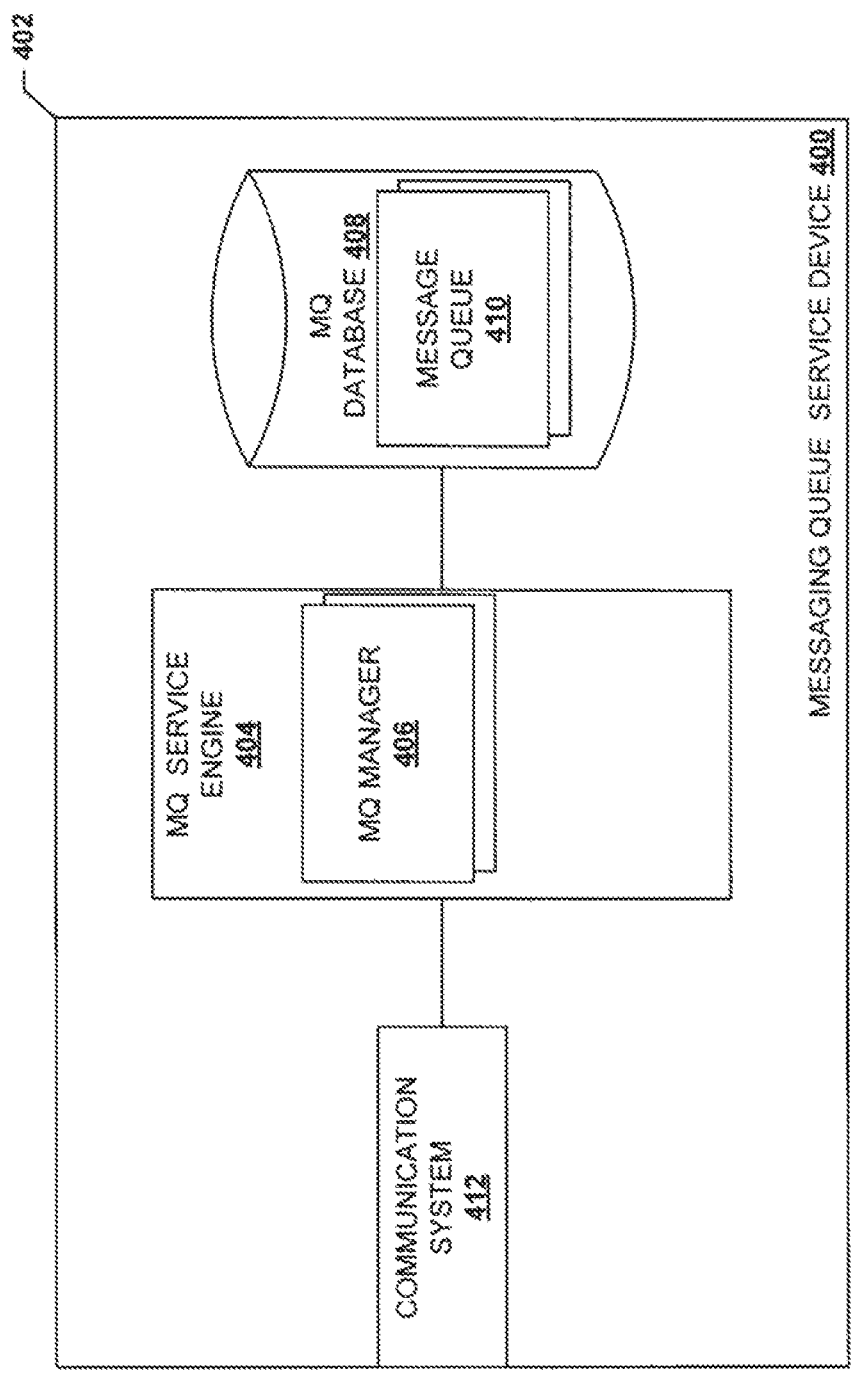
FIG. 4 is a schematic view illustrating an embodiment of a messaging queue service device used in the messaging queue system of FIG. 2.

Referring now to FIG. 4, an embodiment of a messaging queue service device 400 is illustrated that may be the messaging queue service device 230 discussed above with reference to FIG. 2. As such, the messaging queue service device 400 may be the IHS discussed above with reference to FIG. 1 and/or may include some or all of the components of the IHS 100, and in specific embodiments may be provided by a server and/or other computing devices known in the art. In the illustrated embodiment, the messaging queue service device 400 includes a chassis 402 that houses the components of the messaging queue service device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a messaging queue service engine 404 that is configured to perform the functionality of the messaging queue service engines and messaging queue service devices discussed below. In the examples discussed below, the messaging queue service engine 404 provides message-oriented middleware that includes a message queue manager 406, although the provision of other message queue objects by the messaging queue service engine 404 are envisioned as falling within the scope of the present disclosure.

The chassis 402 may also house a storage system (not illustrated, but which may include the storage device 108 discussed above with reference to FIG. 1) that is coupled to the messaging queue service engine 404 (e.g., via a coupling between the storage system and the processing system) and that includes a messaging queue database 408 that is configured to provide for the storage of information from message queues 410 managed by the message queue managers 406, as well as store any of the data that enables the functionality discussed below. The chassis 402 may also house a communication system 412 that is coupled to the messaging queue service engine 404 (e.g., via a coupling between the communication system 412 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a messaging queue service device 400 has been described, one of skill in the art in possession of the present disclosure will recognize that messaging queue service devices may be provided with a variety of other components that provide for conventional messaging queue service device functionality, as well as the functionality discussed below, while remaining within the scope of the present disclosure.

Figure 5:
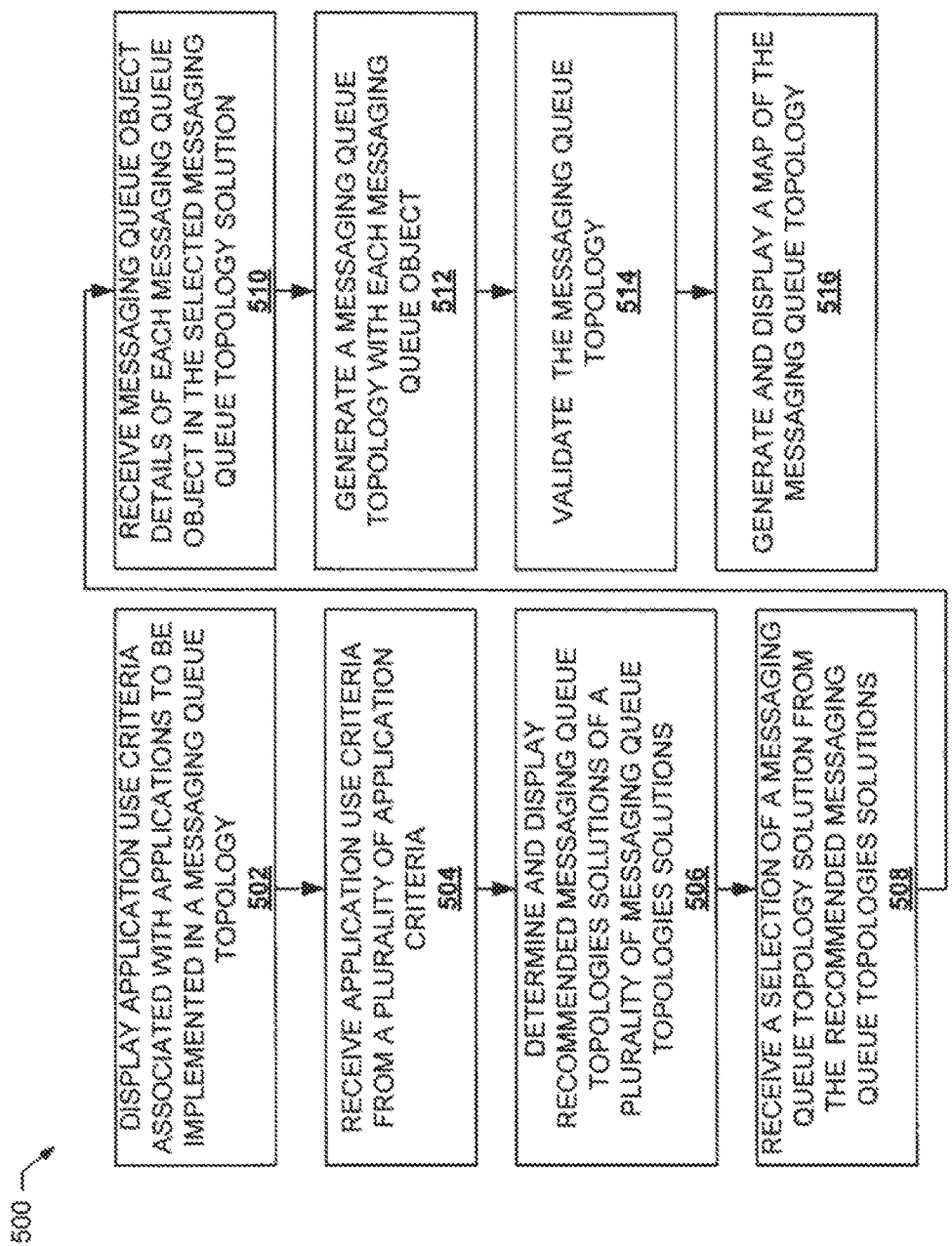
FIG. 5 is a flow chart illustrating an embodiment of a method for configuring a messaging queue topology.

Referring now to FIG. 5, an embodiment of a method 500 for configuring a messaging queue topology is illustrated. As discussed below, the systems and methods of the present disclosure provide a messaging queue topology configuration service that includes a messaging queue topology application that provides a user interface to receive information about the user's messaging queue system, and provides that information to a messaging queue topology generator. The messaging queue topology generator may then use the information about the user's messaging queue system to generate an optimized messaging queue topology for the user's messaging queue system that provides several benefits over messaging queue topologies generated via conventional manual configuration and provisioning techniques for messaging queue topologies. The messaging queue topology configuration service operates to reduce provisioning time for a messaging queue topology relative to conventional methods, as the messaging queue topology configuration service does not require that a user provide individual commands to manually create and configure messaging queue objects for the messaging queue topology. Furthermore, the messaging queue topology configuration service may operate to test the messaging queue topology after it has been provisioned, and provides a user the ability to easily change a messaging queue topology of a messaging queue system if the user's needs for the messaging queue system change. These as well as other benefits will be apparent to one of skill in the art in possession of the present disclosure.

The method 500 begins at block 502 where a plurality of application use criteria that is associated with one or more applications that are to be implemented in a messaging queue topology are displayed via a user interface. With reference to FIG. 2 and FIG. 3, at block 502, a user may utilize the messaging queue topology configuration service device 250/300 to access a messaging queue topology application 306 that provides a user interface through the display system 310 that allows the user to configure a messaging queue topology of the messaging queue system 200. In an embodiment, at block 502 the messaging queue topology application 306 may initiate a messaging queue topology configuration workflow (e.g., in the form of a software "wizard") that is configured to guide a user through the configuration of the messaging queue topology. For example, the messaging queue topology configuration workflow may begin by displaying a plurality of application use criteria via the user interface that is provided by the messaging queue topology application 306 for display on the display system 310. The application use criteria may include categories having one or more selectable options that may be associated with different uses of the messaging queue system 200 that will support the one or more applications 210, 220 utilized in the messaging queue system 200 (as well as information about the applications 210, 220 as well.) For example, the application use criteria may include selectable criteria such as application types, expected message loads, message destination information, messaging queue features of the applications, application to messaging queue connection information, other application use criteria, and/or other information about the user's messaging queue system and/or its intended use that may be used to determine a messaging queue topology and that would be apparent to one of skill in the art in possession of the present disclosure.

Figure 6:
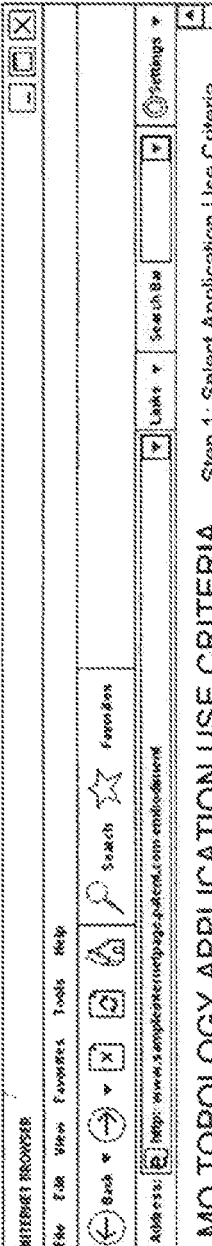
FIG. 6 is a screen shot illustrating an embodiment of an application use criteria selection user interface of a messaging queue topology configuration application displayed on a messaging queue topology configuration service device during the method of FIG. 5.
Figure 7:
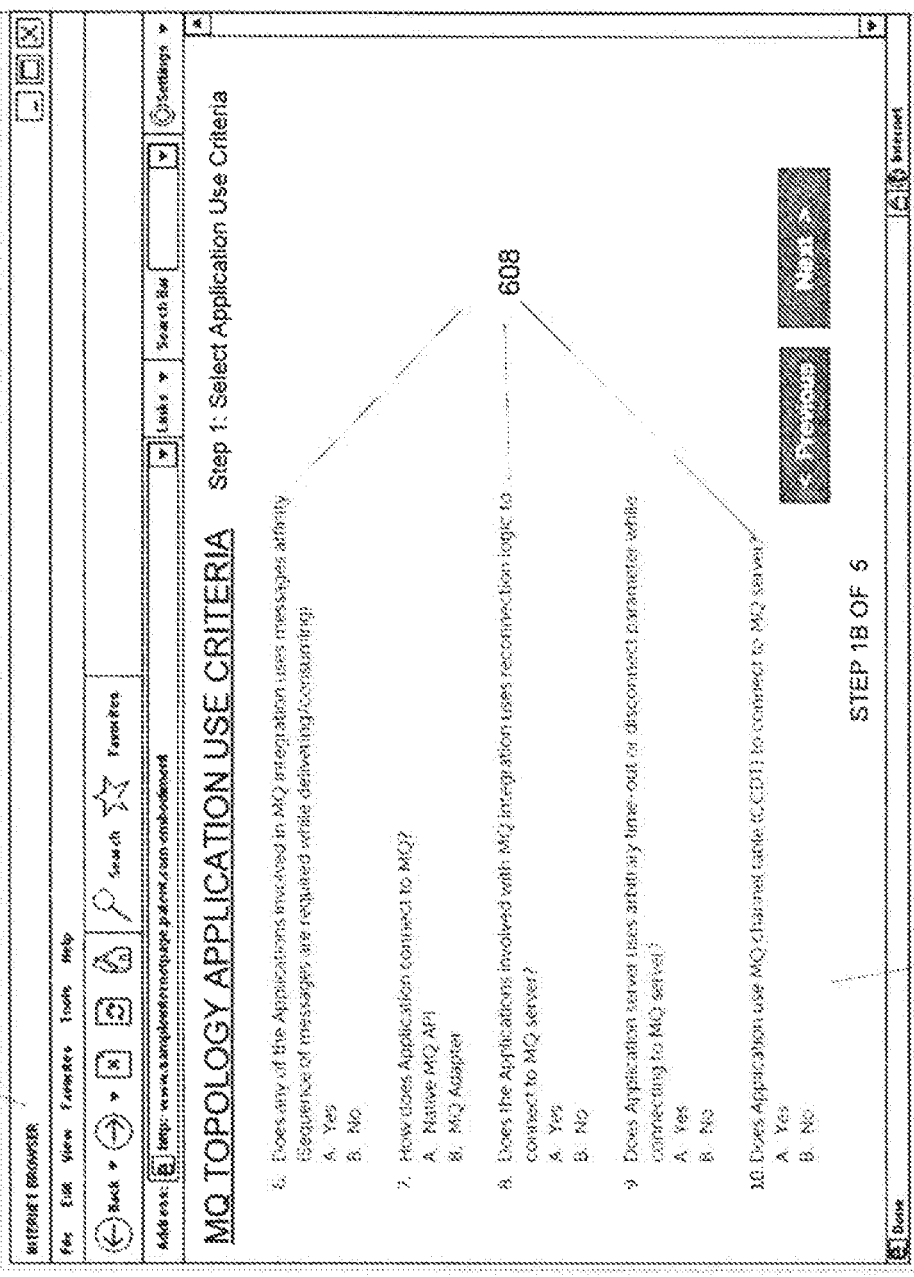
FIG. 7 is a screen shot illustrating an embodiment of the application use criteria selection user interface of FIG. 6 displayed on the messaging queue topology configuration service device during the method of FIG. 5.

Referring to FIGS. 6-12, screenshots of a specific example of a graphical user interface, which may be provided as part of a messaging queue topology configuration directed workflow, is illustrated with reference to method 500 of FIG. 5. Referring to FIG. 6 and FIG. 7, and with reference to block 502 of method 500, an application use criteria user interface 606 may be displayed on a display screen 602 of a user device 600 that may be the messaging queue topology configuration service device 250/300. As illustrated, the user device 600 is a device that is separate and distinct from the messaging queue topology configuration service device 250/300, and may be provided by the IHS discussed above with reference to FIG. 1 and/or may include some or all of the components of the IHS 100. In specific embodiments, the user device 600 may be provided by a computing device (e.g., desktop computing device(s), laptop/notebook computing device(s), tablet computing device(s), mobile phone(s), etc.) known in the art. As illustrated, the application use criteria user interface 606 provided by the messaging queue topology application 306 may be displayed through a browser application 604 that may be used to access the messaging queue topology application 306 through the network 225 (e.g., Internet). However, one of skill in the art in possession of the present disclosure will recognize that the messaging queue topology application 306 may be provided as a native application on the user device 600 (e.g., when the user device 600 and the messaging queue topology configuration service device 250/300 are provided by the same device.)

As illustrated by the screenshot of FIG. 6, the messaging queue topology configuration directed workflow may begin at an application use criteria selection stage, and the application use criteria user interface 606 may display one or more application use criteria 608 for selection by the user. FIG. 7 illustrates additional examples of the application use criteria 608 displayed for selection by the user on the application use criteria user interface 606. The application use criteria 608 may allow the user to define information that describes the user's intended use of a messaging queue system. For example, the application use criteria 608 may allow the user to define the application types (or majority application types) that will be utilized in the messaging queue system such as, for example, service-oriented application types, standalone application types, or a mixture of both. In another example, the application use criteria 608 may allow the user to define the message load (e.g., per day) as, for example, small, medium, or large. In another example, the application use criteria 608 may allow the user to define whether the messages from the application(s) will be sent to multiple destination applications. In another example, the application use criteria 608 may allow the user to define whether the application(s) can use multiple messaging queue host connection strings to connect to a messaging queue In another example, the application use criteria 608 may allow the user to define whether the application(s) fall into categories such as active-active applications, active-passive applications, and/or standalone applications, and/or a mix of such application. In another example, the application use criteria 608 may allow the user to define whether the application(s) use message affinity (i.e., requiring sequences of messages when sending or receiving). In another example, the application use criteria 608 may allow the user to define whether the applications connect to a message queue using a native message queue application program interface (API) or a message queue adapter. In another example, the application use criteria 608 may allow the user to define whether the application(s) use reconnection logic to connect to a messaging queue service device 230/400. In another example, the application use criteria 608 may allow the user to define whether the application(s) use arbitrary time-out or disconnect parameters when connecting to the messaging queue service device 230/400. In another example, the application use criteria 608 may allow the user to define whether the application(s) use a messaging queue channel table to connect to the messaging queue service device 230/400. While specific application use criteria is illustrated and described, other application use criteria that would be apparent to one of skill in the art in possession of the present disclosure may be defined via the application use criteria user interface 606 and used to configure a messaging queue topology while remaining within the scope of the present disclosure.

The method 500 then proceeds to block 504 where application use criteria from the plurality of application use criteria are received. In an embodiment, at block 504, a user may select one or more of the application use criteria displayed on the user interface provided by the messaging queue topology application 306 based on which of that application use criteria is applicable to the application(s) 210, 220 that are to be included in the messaging queue system 200. In response, the messaging queue topology configuration service engine 304 may receive those selections. In another example, the user may input application use criteria via the user interface in order to provide application use criteria that is not displayed in a selectable manner such as the application use criteria illustrated in FIGS. 6 and 7. In a specific example, the user may use a user input device (e.g., a keyboard, a mouse, touchscreen, and/or other user input devices known in the art) to provide the selection and/or input of the application use criteria. In the specific example of FIGS. 6 and 7, the user may select (e.g., "click") on any particular element included in the application use criteria 608 (e.g., an answer of "yes" or "no" to a question included in the application use criteria 608) in order to select it such that the messaging queue topology application 306 receives the selection when the user clicks "Next" to proceed to the next stage of the messaging queue topology configuration directed workflow.

The method 500 then proceeds to block 506 where one or more recommended messaging queue topology solutions are determined based on the selection of the application use criteria, and displayed via the user interface. In an embodiment, at block 506 the messaging queue topology application 306 may determine one or more messaging queue topology solutions based on the application use criteria received at block 504. The messaging queue topology application 306 may then display the one or more messaging queue topology solutions via the user interface provided for display on the display system 310. For example, if the user selects 1C., 2(A, B, or C), 3A, 4A, 5D, 6A and 10A of the application use criteria 608 of FIG. 6, the messaging queue topology application 306 may determine a cluster topology as the messaging queue topology solution for the messaging queue system. In another example, if the user selects 1B, 2A, 3B, 4B, 5C, 6A or 6B, and 10B of the application use criteria 608 of FIG. 6, the messaging queue topology application 306 may determine a point-to-point topology as the messaging queue topology solution. In yet another example, if the user selects 1C., 2A, B, or C, 3A, 4A, 5A, 6A and 10A of the application use criteria 608 of FIG. 6, the messaging queue topology application 306 may determine a load balancer cluster queue topology as the messaging queue topology solution. In yet another example, a hybrid topology (distributed and cluster topology using a MQ gateway) may be selected as the messaging queue topology solution if a combination of cluster, point-to-point, and load balancer cluster topologies is selected. While specific examples of messaging queue topology solutions are illustrated as being determined based on selected application use criteria, one skilled in the art in possession of the present disclosure will recognize that other messaging queue topology solutions may be determined and recommended based on other application use criteria while remaining within the scope of the present disclosure.

Figure 8:
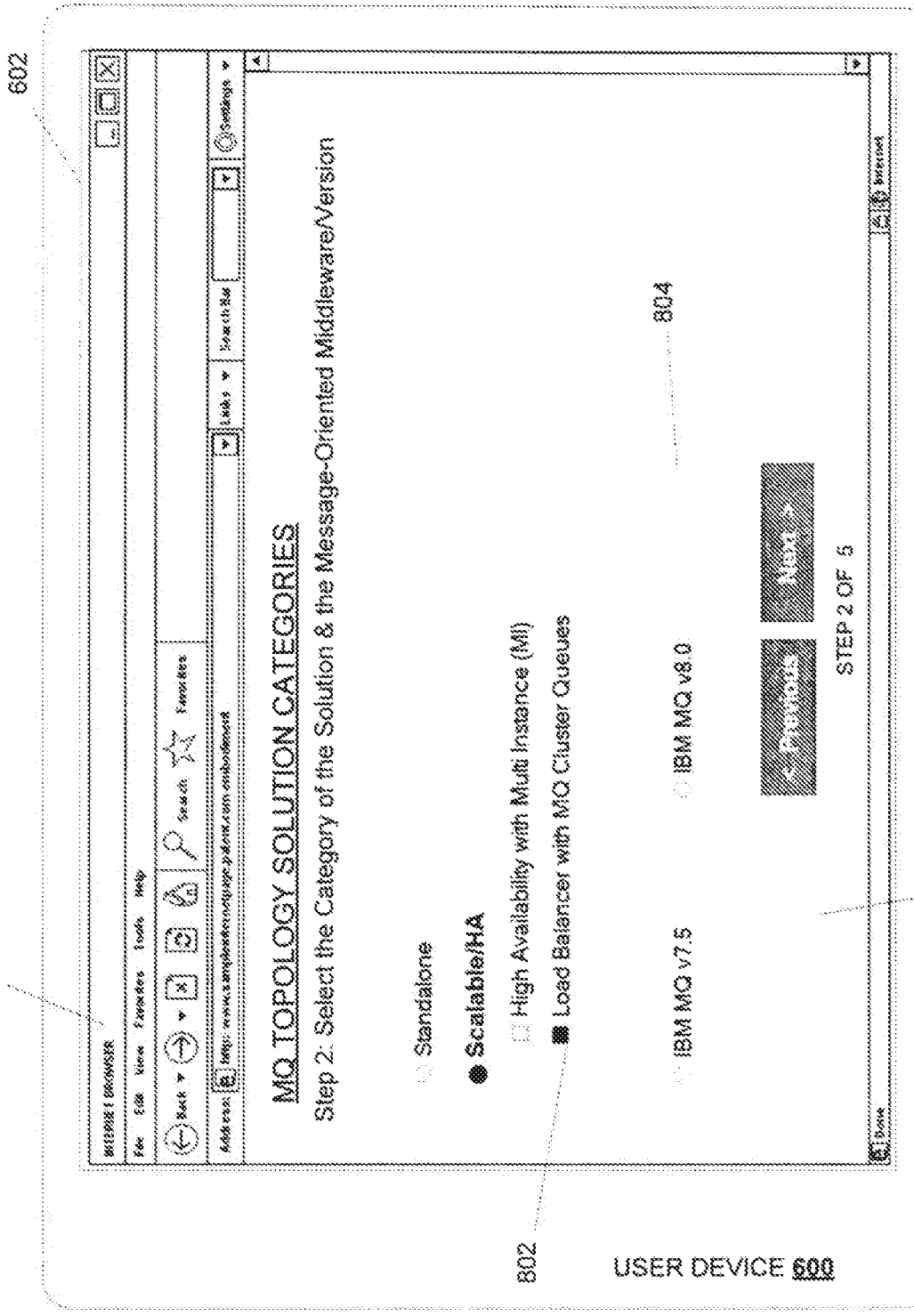
FIG. 8 is a screen shot illustrating an embodiment of a messaging queue topology solution category user interface of the messaging queue topology configuration application displayed on the messaging queue topology configuration service device during the method of FIG. 5.

Continuing with the specific example illustrated in FIGS. 6-12, FIG. 8 and FIG. 9 illustrate embodiments of screenshots of the graphical user interface providing the messaging queue topology configuration directed workflow with respect to block 506 of method 500. For example, FIG. 8 illustrates a messaging queue topology category user interface 806 that is part of the directed workflow and that provides for the determination of a category of the messaging queue topology solutions that were determined by the messaging queue topology application 306 based on the selected application use criteria. For example, the messaging queue topology application 306 may have determined, based on the application use criteria received from the user at block 504, that a recommended messaging queue topology solution category 802 should be a scalable/high availability (HA) messaging queue topology solution that includes load balancing with messaging queue clusters. As can be seen in FIG. 8, in other examples, the recommended messaging queue topology solution category 802 may be a standalone messaging queue topology category, a scalable/HA messaging queue topology solution that includes high availability with multi instance (MI), as well as other messaging queue topology solution categories that would be apparent to one of skill in the art in possession of the present disclosure.

The messaging queue topology category user interface 806 of FIG. 8 may also include a message-oriented middleware service selection box 804 that allows the user of the messaging queue topology application to select the message-oriented middleware and/or the version of the message-oriented middleware that is included in the user's messaging queue system and that provides the messaging queue service engine 404 of FIG. 4. In an embodiment, the messaging queue topology solution categories and the messaging queue topology solutions available to the user may depend on which message-oriented middleware service is included on the messaging queue system 200. In the example illustrated in FIG. 8, the user may select between IBM® WebSphere MQ 7.5 and IBM® MQ 8.0. However, in other examples, the user may select between other versions (e.g., IBM® MQ 9.0) and/or other vender's message-oriented middleware services such as RabbitMQ®, StormMQ®, Apache® ActiveMQ, Java® Message Service (JMS), Microsoft® Message Queuing (MSMQ), and/or other message-oriented middleware services that would be apparent to one of skill in the art in possession of the present disclosure.

In some embodiments, the messaging queue topology configuration directed workflow illustrated in FIG. 8 may be provided prior to the determination and display (via the user interface) of one or more recommended messaging queue topology solutions that are based on the selection of application use criteria discussed at block 504 of method 500. Furthermore, while the messaging queue topology category user interface 806 of FIG. 8 may provide a recommended messaging queue topology category and/or message-oriented middleware service, the messaging queue topology category user interface 806 may allow a user to override the automatic selections and proceed with a messaging queue topology category and/or a message-oriented middleware service that is selected by the user. In other examples, the user may go back to the application use criteria user interface 606 by clicking the 'Previous' button in order to, for example, change the application use criteria to change the recommended messaging queue topology solution category 802.

Upon selection of the messaging queue topology category and/or message-oriented middleware service displayed on the messaging queue topology category user interface 806, a user may select the 'Next' button to cause the messaging queue topology application 306 to determine which messaging queue topology solutions are available for the selected messaging queue topology solutions category and/or message-oriented middleware service identified by the user via the messaging queue topology category user interface 806. The messaging queue topology application 306 may determine, based on the application use criteria received at block 504, which of a plurality of available messaging queue topology solutions to recommend through a messaging queue topology solution interface 906, illustrated in FIG. 9. For example, the messaging queue topology solutions may include a distributed point-to-point (one to one) topology solution, a load balancer cluster queue topology solution, a hybrid topology solution (e.g., a distributed and cluster topology solution using a messaging queue gateway), a publisher/subscriber topology solution (one to many), and/or other messaging queue topology solutions that would be apparent to one of skill in the art in possession of the present disclosure.

Figure 9:
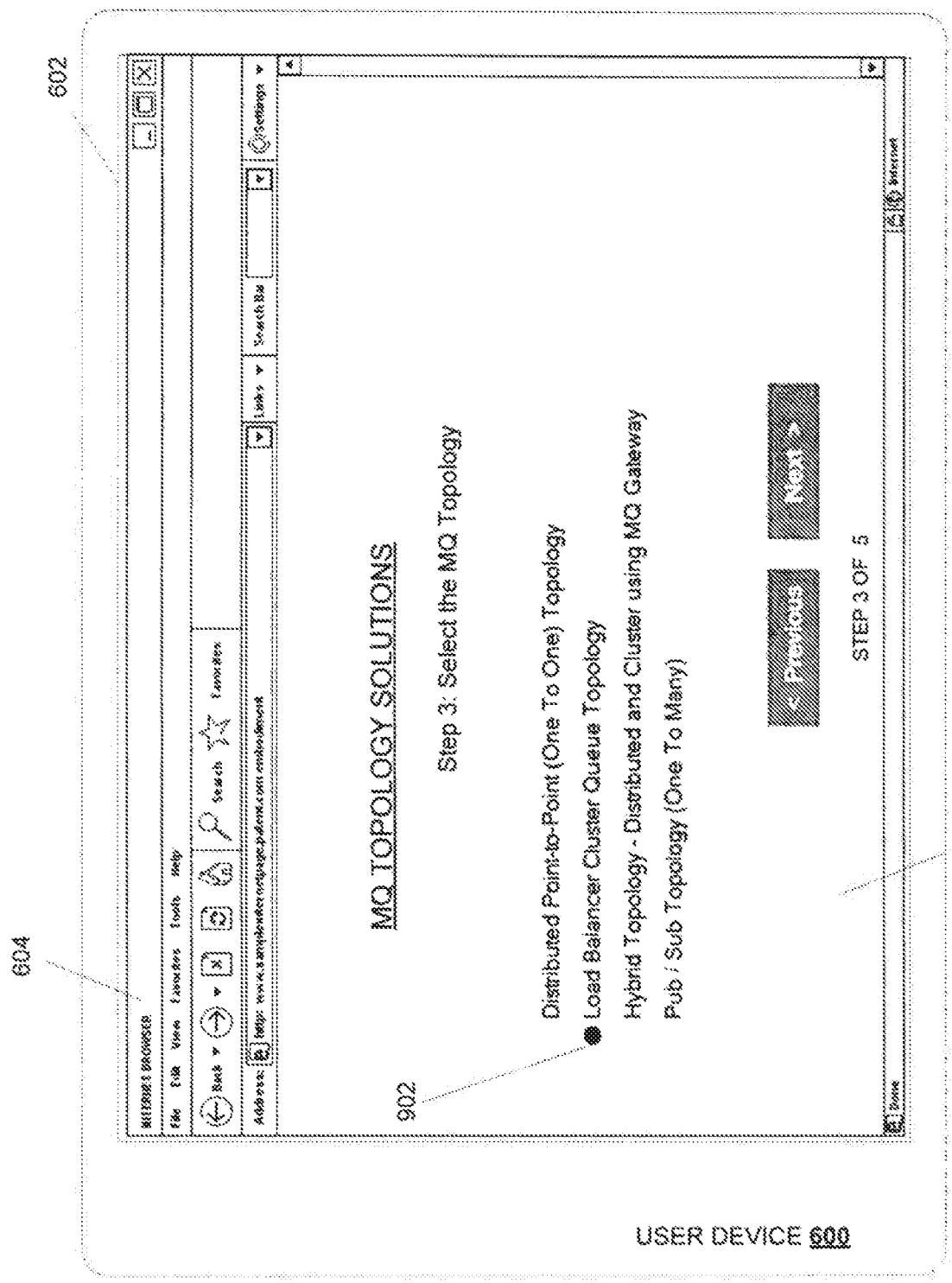
FIG. 9 is a screen shot illustrating an embodiment of a messaging queue topology solution user interface of the messaging queue topology configuration application displayed on the messaging queue topology configuration service device during the method of FIG. 5.

More specifically, if the user uses the messaging queue topology category user interface 806 to select the 'Standalone' messaging queue topology solution category, a single queue interface topology solution may be displayed for selection on the messaging queue topology solution interface 906 of FIG. 9. However, in an example where the 'High Availability Using Multi Instance' messaging queue topology solution category was selected by the user via the messaging queue topology category user interface 806, the distributed point-to-point (one to one) topology solution and the publisher/subscriber topology solution (one to many) may be displayed for selection on the messaging queue topology solution interface 906 of FIG. 9. Furthermore, in an example where the 'Load Balancer with MQ Cluster Queues' messaging queue topology solution category was selected by the user via the messaging queue topology category user interface 806, the load balancer cluster queue topology solution and the publisher/subscriber topology solution (one to many) may be displayed for selection on the messaging queue topology solution interface 906 of FIG. 9. As illustrated by the specific example in FIG. 9, the messaging queue topology solution interface 906 may determine and display a recommended messaging queue topology solution 902 based on the application use criteria received at block 504 via the application use criteria user interface 606 of FIG. 6 and FIG. 7, as well as the messaging queue topology solution category and/or message-oriented middleware service selected at block 506 via the messaging queue topology category user interface 806 of FIG. 8 (e.g., a load balancer cluster queue topology solution in the illustrated embodiment.)

The method 500 then proceeds to block 508 where a selection of a messaging queue topology from the one or more recommended messaging queue topology solutions is received. In an embodiment, at block 508, a user may select a messaging queue topology solution from the one or more messaging queue topology solutions that are displayed of block 506 (e.g., via the user interface displayed on the display system 310.) For example, the user may use a user input device to provide the input that makes the selection of the messaging queue topology solution. In a specific example, the user may select a recommended messaging queue topology solution that was determined by the messaging queue topology application 306. For example, using the embodiment illustrated in FIG. 9, the user may select (e.g., "click") on a button that is associated with the determined messaging queue topology solution 902 to select it, or that button may be provided as pre-selected by the messaging queue topology application 306 based on the application use criteria. At block 508, the messaging queue topology application 306 receives the selection when the user selects "Next" on the messaging queue topology solution interface 906 to proceed to the next stage of the messaging queue topology configuration directed workflow.

The method 500 then proceeds to block 510 where messaging queue object details for each of a plurality of messaging queue objects that will make up a messaging queue topology are received. In an embodiment, at block 510 the user inputs messaging queue object details into the user interface that is provided by the messaging queue topology application 306 and that is displayed on the display system 310. For example, the user may use a user input device to provide inputs that identify the messaging queue object details. As would be understood by one of skill in the art in possession of the present disclosure, in object-oriented programming, an object is a concrete realization (instance) of a class that includes data and the operations associated with that data. The object includes the instance data that is defined by the class, but the class owns the operations that are associated with the data. As an example, a messaging queue object in IBM® MQ may be a queue manager, a queue, a process definition, a channel, a namelist, an authentication information object, an administrative topic object, a listener, a service object, a coupling facility structure (CF structure), a storage class, a queue-sharing group provided by WebSphere® MQ for z/OS® and a variety of other messaging queue objects that would be apparent to one of skill in the art in possession of the present disclosure. Furthermore, the messaging queue object details may include attributes about each object. For example, a queue may have attributes that include a queue type, whether an application can retrieve messages from the queue (e.g., whether it is GET enabled), whether an application can put messages on the queue (e.g., whether it is PUT enabled), whether access to the queue is shared between applications or exclusive to an application, a maximum number of messages that can be stored on the queue at the same time (e.g., a maximum queue depth), the maximum length of messages that that can be put on the queue, and/or other attributes known in the art. At block 510, the user may provide an environment on which the messaging queue topology needs to be created prior to providing messaging queue objects and their respective messaging queue object details. For example, the environment may include the server computing devices 205, applications 210, client computing devices 215, and the application 220.

Figure 10:
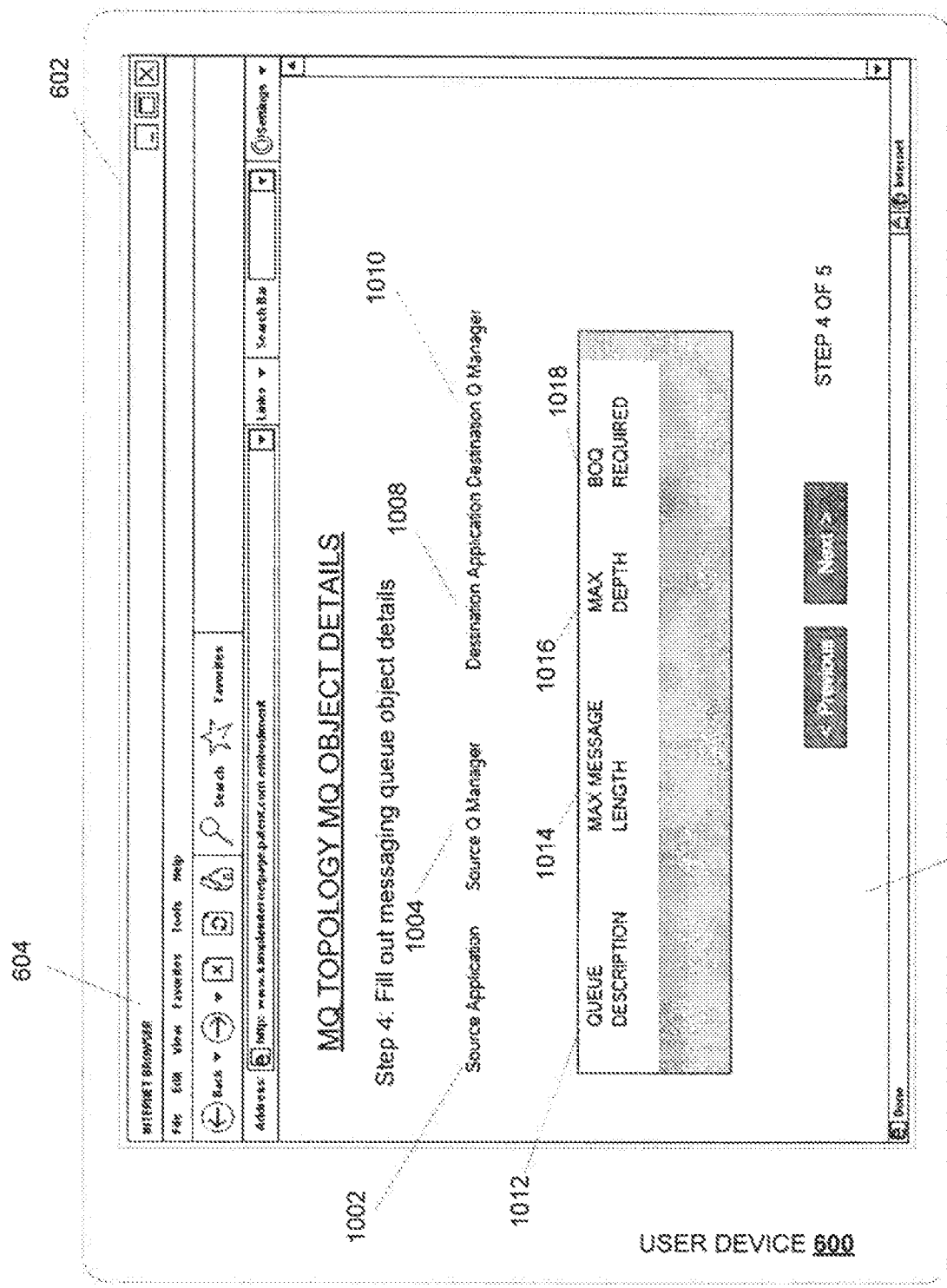
FIG. 10 is a screen shot illustrating an embodiment of messaging queue object user interface of the messaging queue topology configuration application displayed on the messaging queue topology configuration service device during the method of FIG. 5.

Continuing with the specific example illustrated in FIGS. 6-12, FIG. 10 illustrates a screenshot of a graphical user interface provided in the messaging queue topology configuration directed workflow used for the messaging queue topology configuration of method 500 with respect to block 510 of method 500. FIG. 10 illustrates a messaging queue object user interface 1006 that may be provided in the messaging queue topology configuration directed workflow to allow a user to provide messaging queue objects and messaging queue object details to the messaging queue topology application 306. In an embodiment, the messaging queue object user interface 1006 may be "directed" in that the user may input messaging queue objects and associated messaging queue object details when prompted by the messaging queue object user interface 1006. For example, as illustrated in FIG. 10, the messaging queue object user interface 1006 may provide one or more data entry fields and/or drop down menus for a source application 1002, a source queue manager 1004, a destination application 1008, and a destination queue manager 1010. The messaging queue object user interface 1006 may also provide a data entry field for a queue that allows the user to input one or more messaging queue object details such as, for example, attributes of a message queue. The attributes may include a queue description 1012, a maximum message length 1014, a maximum message depth 1016, and whether the queue is back out queue (BOQ) required 1018. The user may utilize the messaging queue object user interface 1006 to provide messaging queue object details for any number of messaging queue objects to the messaging queue topology application 306 so that the messaging queue topology application 306 receives the messaging queue object details for each of the plurality of messaging queue objects that will make up a messaging queue topology (e.g., when the user selects "Next" to proceed to the next stage of the messaging queue topology configuration directed workflow.)

The method 500 then proceeds to block 512 where the messaging queue topology is generated that includes the messaging queue objects according to the messaging queue topology solution and the messaging queue object details determined as discussed above. In an embodiment, at block 512 the messaging queue topology generator 308 may receive the messaging queue topology solution and the messaging queue object details from the messaging queue topology application 306 and, based on the messaging queue object details and the messaging queue topology solution, the messaging queue topology generator 308 may configure the messaging queue objects into the messaging queue topology identified by the messaging queue topology solution. The messaging queue topology generator may implement the generated messaging queue topology in the messaging queue system 200 by creating the messaging queue objects within the messaging queue system. For example, the messaging queue topology generator 308 may be configured to provide a set of messaging queue commands over the network 225 to the messaging queue service device 230/400 that cause the messaging queue service device 230/400 to create messaging queue topology objects (e.g., using the messaging queue service engine 404) based on which messaging queue topology solution was selected. For example, if a 'messaging queue cluster topology' solution is selected as the messaging queue topology solution, the messaging queue topology generator 308 may provide:

DEFINE QLOCAL (queuename)+
DESCR ('Queue for IBM envs')+
PUT (ENABLED)+
GET (ENABLED)+
NOTRIGGER+
MSGDLVSQ (PRIORITY)+
MAXDEPTH (5000)+
MAXMSGL (4194304)+
USAGE (NORMAL);

and/or any other messaging queue commands that provide for the generation of messaging queue objects.

After the generated messaging queue topology is implemented with the messaging queue objects within the messaging queue system 200, the messaging queue topology generator 308 may execute an optimization test program to determine whether the generated messaging queue topology is optimized. In an embodiment, the optimization test program may test configurable messaging queue object attributes by adjusting one or more configurable messaging queue object attributes (e.g., a queue length), performing a test on the messaging queue topology (e.g., performing PUT and GET operation(s)), recording a result of the test (e.g., latency), and comparing the result with previously obtained results or testing criteria. The test on the messaging queue objects may be iterated a predefined number of times or until optimized messaging queue object attributes are determined. Similarly, the messaging queue topology generator 308 may iteratively test configurable network parameters (e.g., to identify optimized TCP values in order to attain maximum number of connections in a TCP stack), iteratively test configurable operating system parameters to identify optimized values for an operating system kernel, and/or iteratively test configurable storage parameters to identify the optimized values for a maximum input/output throughput in a storage system (e.g., the message queue database 408). Application use criteria 608 selected in questions 7-9 of FIG. 7 may be used to set the optimization test program when testing the messaging queue object attributes.

In an embodiment, before implementing the configuration of the generated messaging queue topology into the messaging queue system 200, the messaging queue topology generator 308 may determine whether the generated messaging queue topology is substantially similar to a previously generated messaging queue topology that already exists in that messaging queue system 200. For example, the applications that already exist in a messaging queue system 200 may be configured to message each other using the same messaging queue objects in the same messaging queue topology that was generated by the messaging queue topology generator 308 according to the teachings discussed above. In response to a substantially similar messaging queue topology already existing in the messaging queue system 200, the messaging queue topology configuration service engine 304 may provide the user an indication (e.g., through the user interface displayed on the display system 310) that the generated messaging queue topology already exists, and may provide an option to stop proceeding any further in the messaging queue topology configuration directed workflow.

In an embodiment where the generated messaging queue topology is replacing an existing messaging queue topology, in addition to implementing the generated messaging queue topology in the messaging queue system 200, the messaging queue topology generator may generate a backup script file of the existing messaging queue topology that the generated messaging queue topology is replacing. The backup script file may be stored in the messaging queue topology database 314 and used to roll back the generated messaging queue topology to the prior existing messaging queue topology in the event that the generated messaging queue topology fails or is otherwise unsatisfactory to the user.

The method 500 then proceeds to block 514 where the messaging queue topology is validated. In an embodiment, at block 514 the messaging queue topology generator 308 may perform a PUT command and a GET command to determine whether the messaging queues and messaging queue objects, as well as other messaging queue objects, are configured correctly. The messaging queue topology generator 308 may put (e.g., via a PUT command) a test message on a messaging queue and retrieve (e.g., via a GET command) the test message from that message queue (or a different message queue depending on the messaging queue topology) to determine whether the generated messaging queue topology is operating correctly. While a specific example of a validation technique for validating messaging queue topologies using PUT commands and GET commands is discussed, other validation techniques that would be apparent to one of skill in the art in possession of the present disclosure may be utilized while remaining in the scope of the present disclosure.

The method 500 then proceeds to block 516 where a map of the generated messaging queue topology is generated and displayed via the user interface. In an embodiment, at block 516 the messaging queue topology configuration service engine 304 may generate a messaging queue topology map of the generated messaging queue topology, and provide the messaging queue topology map for display to the user via the user interface provided by the display system 310. The messaging queue topology map may display the messaging queue objects, and how they are connected with respect to each other in the generated messaging queue topology, in order to allows a user to visualize the generated messaging queue topology in the messaging queue system 200 and identify all of the messaging queue objects in the messaging queue system 200

Figure 11:
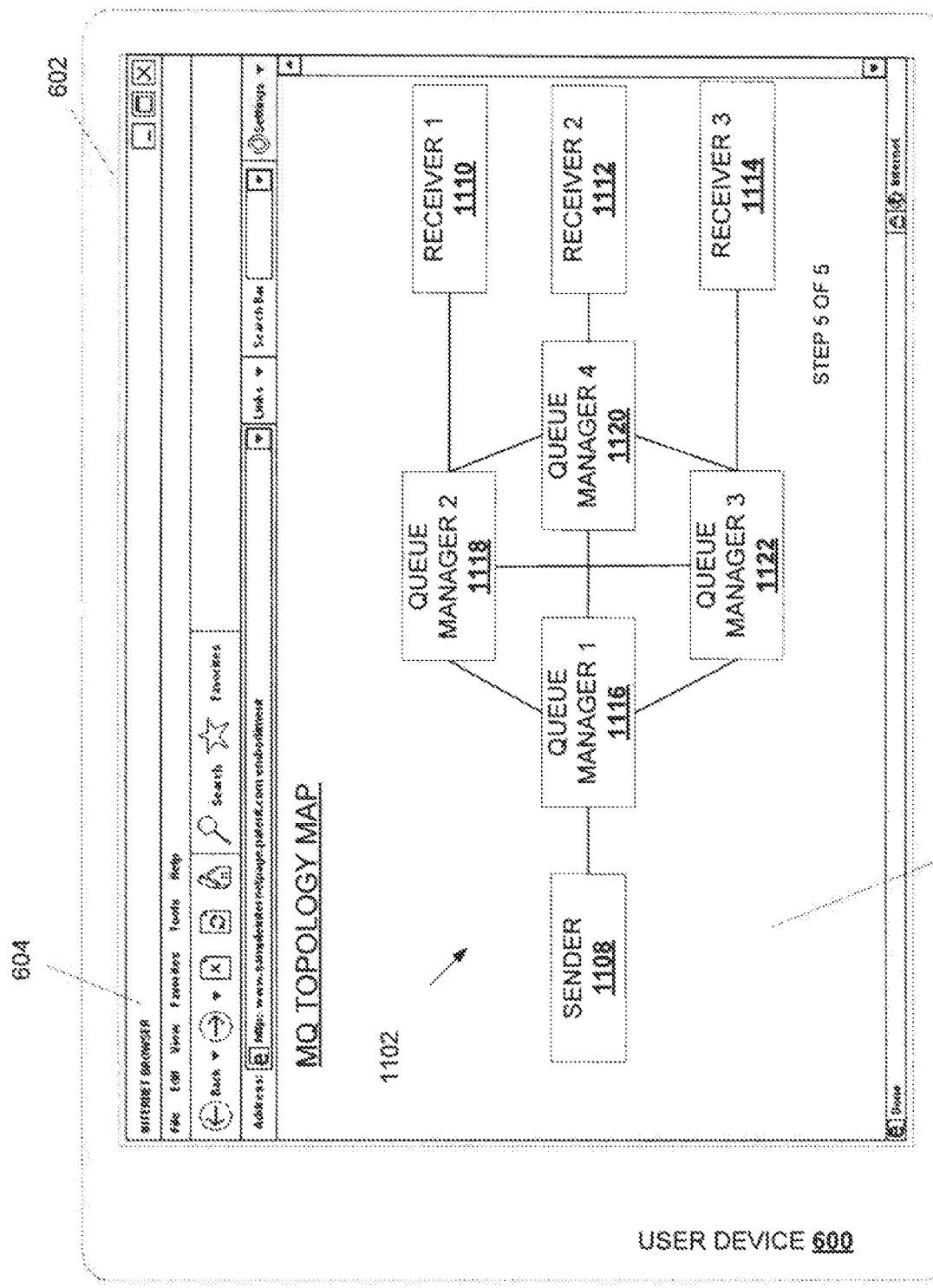
FIG. 11 is a screen shot illustrating an embodiment of a messaging queue topology map illustrating a cluster messaging queue topology created based on the results of the messaging queue topology configuration during the method of FIG. 5.

Continuing with the specific example illustrated in FIGS. 6-12, FIG. 11 and FIG. 12 illustrate screenshots of a graphical user interface provided in the messaging queue topology configuration directed workflow used for the messaging queue topology configuration of method 500 with respect to blocks 512, 514, and 516. FIG. 11 illustrates a messaging queue topology map user interface 1106 provided in the messaging queue topology configuration directed workflow, which includes a messaging queue topology map 1102 displayed via the messaging queue topology map user interface 1106 on the display screen 602 of the user device 600. The messaging queue topology map 1102 may include the generated messaging queue topology, and the messaging queue objects included in that generated messaging queue topology. As illustrated in FIG. 11, the messaging queue topology map 1102 includes the 'load balancer cluster queue topology', as selected using the messaging queue topology solution interface 906 of FIG. 9, with multiple application host devices (e.g., a sender 1108, a receiver 1110, a receiver 1112, and a receiver 1114) each hosting a respective message queue manager in a cluster (e.g., a message queue manager 1116, a message queue manager 1118, a message queue manager 1120, and/or a message queue manager 1122, respectively).

Figure 12:
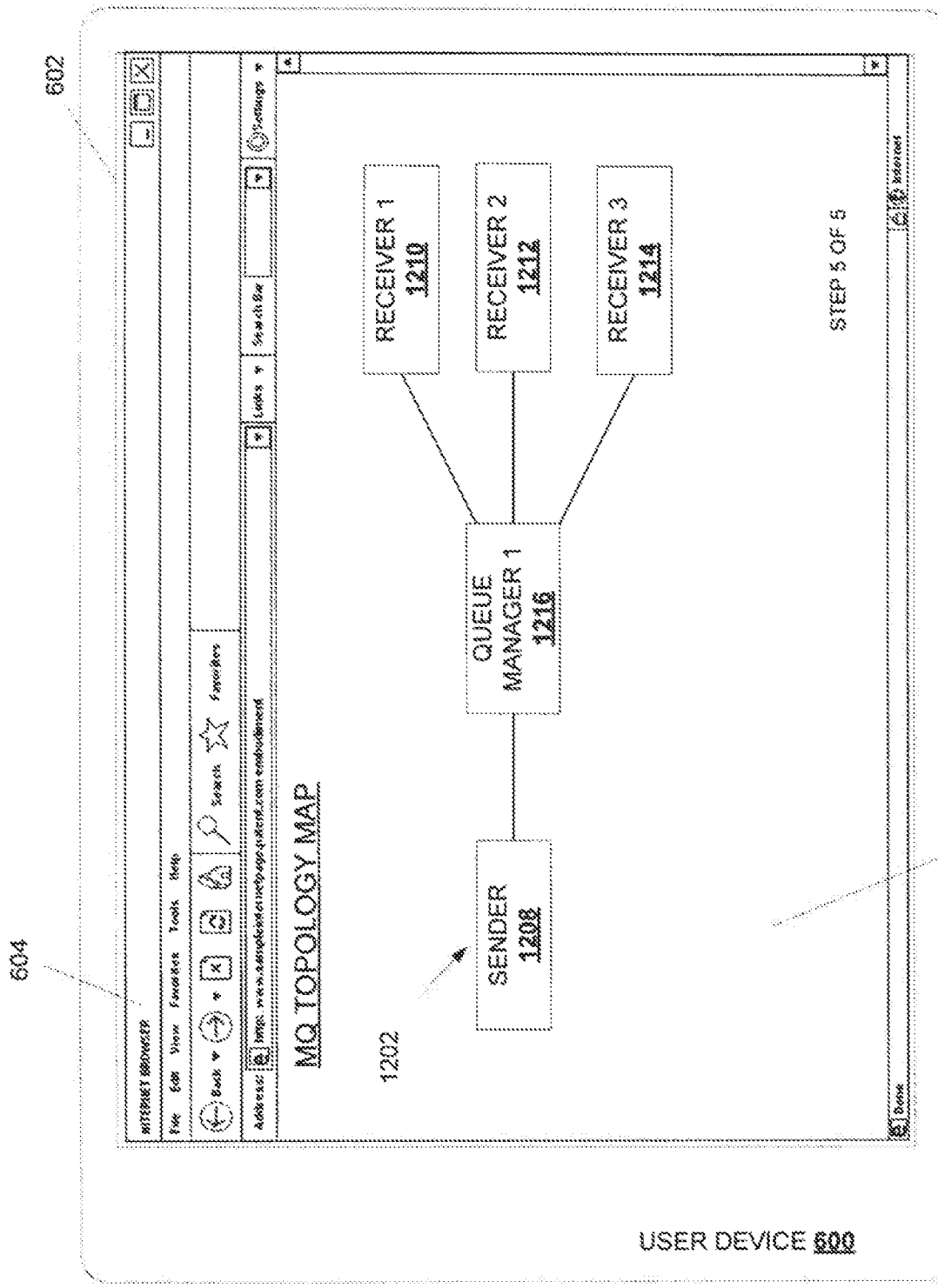
FIG. 12 is a screen shot illustrating an embodiment of a messaging queue topology map illustrating a point-to-point messaging queue topology created based on the results of the messaging queue topology configuration during the method of FIG. 5.

FIG. 12 illustrates a messaging queue topology map user interface 1206 provided in the messaging queue topology configuration directed workflow, which includes a messaging queue topology map 1202 displayed via the messaging queue topology map user interface 1106 on the display screen 602 of the user device 600. The messaging queue topology map 1202 may include the generated messaging queue topology, and the messaging queue objects included in that generated messaging queue topology. As illustrated in FIG. 12, the messaging queue topology map 1202 includes the 'point-to-point messaging queue topology', with a sender 1208 (e.g., an application host device that produces messages) that provides messages to a queue managed by a message queue manager 1216, and receivers 1210, 1212, and 1214 that consume messages from the queue. As would be understood by one of skill in the art in possession of the present disclosure, in a point-to-point messaging queue topology, each message produced can only be consumed by one receiver, and routing is determined per-queue and embedded in a network definition at build time. By contrast, messages in the cluster queue topology, illustrated in FIG. 11, travel from a point of origin to one of several possible destinations. In the cluster queue topology, the selection of the destination (e.g., receiver) and routing both occur per-message at run time. As such, cluster queue topologies greatly reduce the number of messaging queue objects in a messaging queue system, and are more scalable and flexible than point-to-point messaging queue topologies, making them ideal for service-oriented architectures (SOA), while point-to-point topologies are more suited for a traditional batch interface and legacy systems.

Thus, systems and methods have been described that provide for the configuration of messaging queue topologies having messaging queue objects within a messaging queue system. By using a messaging queue topology configuration directed workflow, a user is guided through the configuration of a messaging queue topology, with the messaging queue topology configuration directed workflow recommending a messaging queue topology to the user based on how the user is going to use a messaging queue system. A messaging queue topology generator builds and optimizes the messaging queue topology for the messaging queue system based on the user's use inputs and a messaging queue topology solution. The systems and methods of the present disclosure provide for a more efficient messaging queue topology configuration where a messaging queue configuration service engine can build a messaging queue topology and implement the messaging queue topology that would otherwise require manual generation via the creation of messaging queue managers and other messaging queue objects at various server devices. The messaging queue topology configuration service may also optimize configurable attributes of the messaging queue topology to provide an optimized messaging queue topology, as well as display a user interface that allows the user to visualize the built messaging queue topology before it is implemented in an environment.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A messaging queue system, comprising:
 a plurality of computing devices that are coupled to each other through a network and that each host one or more applications;
 a messaging queue service device that is coupled to the plurality of computing devices and that hosts a messaging queue service for each of the one or more applications; and
 a messaging queue topology configuration service device that is coupled to the messaging queue service device, wherein the messaging queue topology configuration service device is configured to:
   display, via a user interface, a plurality of application use criteria that is associated with the one or more applications that are to be implemented in a messaging queue topology;
   receive, via the user interface, a selection of a subset of the application use criteria from the plurality of application use criteria;
   determine one or more recommended messaging queue topology solutions based on the selection of the subset of the application use criteria;
   display, via the user interface, the one or more recommended messaging topologies solutions;
   receive, via the user interface, a selection of a first messaging queue topology solution from the one or more recommended messaging queue topology solutions;
   receive, via the user interface, messaging queue object details for each messaging queue object of a plurality of messaging queue objects that will make up the first messaging queue topology solution; and
   create a messaging queue topology with each messaging queue object of the plurality of messaging queue objects based on the first messaging queue topology solution and the messaging queue object details.

2. The messaging queue system of claim 1, wherein the messaging queue topology configuration service device is configured to:
 create a script file of a current messaging queue topology configuration of the plurality of messaging queue objects prior to implementing the messaging queue topology with each messaging queue object, wherein the script file of the current messaging queue topology configuration provides a failover for the messaging queue topology.

3. The messaging queue system of claim 1, wherein the messaging queue topology configuration service device is configured to:
 generate a messaging queue topology map of the messaging queue topology; and
 display, via the user interface, the messaging queue topology map.

4. The messaging queue system of claim 1, wherein the messaging queue topology configuration service device is configured to:
 display, via the user interface, including a plurality of messaging queue topology solution categories based on the selection of the application use criteria; and
 receive, via the user interface, a selection of a messaging queue topology solution category of the plurality of messaging queue topology solution categories, wherein the displaying, via the user interface, the one or more recommended messaging queue topology solutions of the plurality of messaging queue topology solutions is based on the selection of the messaging queue topology solution category.

5. The messaging queue system of claim 1, wherein the messaging queue topology configuration service device is configured to:

validate the messaging queue topology by providing a test message on a messaging queue of the messaging queue topology with a put command and retrieving the test message from the messaging queue with a get command.

6. The messaging queue system of claim 1, wherein the creating the messaging queue topology with each messaging queue object based on the first messaging queue topology solution and the messaging queue object details includes implementing at least one of a queue manager, a channel, a topic, a publisher, and a subscriber.

7. The messaging queue system of claim 1, wherein the creating the messaging queue topology with each messaging queue object based on the first messaging queue topology solution and the messaging queue object details includes optimizing at least one of a configurable messaging queue object attribute, a configurable operating system parameter, a configurable network parameter, and a configurable storage parameter.

8. An information handling system (IHS), comprising:
a display device;
a user input device;
a processing system that is coupled to the display device and the user input device; and
a memory system that is coupled to the processing system and that includes instructions that, when executed by the processing system, cause the processing system to:
display, on the display device, a user interface that includes a plurality of application use criteria that is associated with one or more applications that are to be implemented in a messaging queue topology;
receive, from the user input device and via the user interface, a selection of a subset of the application use criteria from the plurality of application use criteria;
determine one or more recommended messaging queue topology solutions based on the selection of the subset of the application use criteria and display, on the display device, the user interface including the one or more recommended messaging topologies solutions;
receive, from the user input device and via the user interface, a selection of a first messaging queue topology solution of the one or more recommended messaging queue topology solutions;
receive, from the user input device and via the user interface, messaging queue object details for each messaging queue object of a plurality of messaging queue objects that will make up the first messaging queue topology solution; and
create a messaging queue topology with each messaging queue object of the plurality of messaging queue objects based on the first messaging queue topology solution and the messaging queue object details.

9. The IHS of claim 8, wherein the instructions, when executed by the processing system, cause the processing system to:
create a script file of a current messaging queue topology configuration of the plurality of messaging queue objects prior to implementing the messaging queue topology with each messaging queue object, wherein the script file of the current messaging queue topology configuration provides a failover for the messaging queue topology.

10. The IHS of claim 8, wherein the instructions, when executed by the processing system, cause the processing system to:
generate a messaging queue topology map of the messaging queue topology; and
display, on the display device, the user interface including the messaging queue topology map.

11. The IHS of claim 8, wherein the instructions, when executed by the processing system, cause the processing system to:
display, on the display device, the user interface including a plurality of messaging queue topology solution categories based on the selection of the application use criteria; and
receive, from the user input device via the user interface, a selection of a messaging queue topology solution category of the plurality of messaging queue topology solution categories, wherein the displaying the user interface including the one or more recommended messaging queue topology solutions of the plurality of messaging queue topology solutions is based on the selection of a messaging queue topology solution category.

12. The IHS of claim 8, wherein the instructions, when executed by the processing system, cause the processing system to:
validate the messaging queue topology by providing a test message on a messaging queue of the messaging queue topology with a put command and retrieving the test message from the messaging queue with a get command.

13. The IHS of claim 8, wherein the creating the messaging queue topology with each messaging queue object based on the first messaging queue topology solution and the messaging queue object details includes implementing at least one of a queue manager, a channel, a topic, a publisher, and a subscriber.

14. The IHS of claim 8, wherein the creating the messaging queue topology with each messaging queue object based on the first messaging queue topology solution and the messaging queue object details includes optimizing at least one of a configurable messaging queue object attribute, a configurable operating system parameter, a configurable network parameter, and a configurable storage parameter.

15. A method for generating a messaging queue topology, comprising:
displaying, by a user device via a user interface, a plurality of application use criteria that is associated with one or more applications that are to be implemented in a messaging queue topology;
receiving, by the user device via the user interface, a selection of a subset of application use criteria from the plurality of application use criteria;
determining, by the user device, one or more recommended messaging queue topology solutions based on the selection of the subset of the application use criteria and displaying, by the user device via the user interface, the one or more recommended messaging topologies solutions;
receiving, by the user device via the user interface, a selection of a first messaging queue topology solution of the one or more recommended messaging queue topology solutions;
receiving, by the user device via the user interface, messaging queue object details for each messaging queue object of a plurality of messaging queue objects that will make up the first messaging queue topology solution; and
creating, by the user device, a messaging queue topology with each messaging queue object of the plurality of messaging queue objects based on the first messaging queue topology solution and the messaging queue object details.

16. The method of claim 15, further comprising:
creating, by the user device, a script file of a current messaging queue topology configuration of the plurality of messaging queue objects prior to implementing the messaging queue topology with each messaging queue object, wherein the script file of the current messaging queue topology configuration provides a failover for the messaging queue topology.

17. The method of claim 15, further comprising:
generating, by the user device, a messaging queue topology map of the messaging queue topology; and
displaying, by the user device via the user interface, the messaging queue topology map.

18. The method of claim 15, further comprising:
display, by the user device via the user interface, a plurality of a messaging queue topology solution categories based on the selection of the application use criteria; and receive, by the user device via the user interface, a selection of a messaging queue topology solution category of the plurality of messaging queue topology solution categories, wherein the displaying the one or more recommended messaging queue topology solutions of the plurality of messaging queue topology solutions is based on the selection of a messaging queue topology solution category.

19. The method of claim 15, further comprising:
validating, by the user device, the messaging queue topology by providing a test message on a messaging queue of the messaging queue topology with a put command and retrieving the test message from the messaging queue with a get command.

20. The method of claim 15, wherein the creating the messaging queue topology with each messaging queue object based on the first messaging queue topology solution and the messaging queue object details includes implementing at least one of a queue manager, a channel, a topic, a publisher, and a subscriber.

* * * * *